United States Patent
Heater et al.

(10) Patent No.: US 8,465,818 B2
(45) Date of Patent: Jun. 18, 2013

(54) POLYAMIDES AND POLYESTERS BLENDED WITH A LITHIUM SALT INTERFACIAL TENSION REDUCING AGENT

(75) Inventors: Paul Lewis Heater, Navarre, OH (US); Guliz Arf Elliott, Northfield Center, OH (US)

(73) Assignee: M & G USA Corporation, Apple Grove, WV (US)

( * ) Notice: Subject to any disclaimer, the term of this patent is extended or adjusted under 35 U.S.C. 154(b) by 1351 days.

(21) Appl. No.: 11/537,672

(22) Filed: Oct. 2, 2006

(65) Prior Publication Data

US 2007/0082157 A1 Apr. 12, 2007

Related U.S. Application Data

(60) Provisional application No. 60/725,085, filed on Oct. 7, 2005, provisional application No. 60/827,147, filed on Sep. 27, 2006.

(51) Int. Cl.
*B29C 49/00* (2006.01)
*C08L 67/02* (2006.01)
*C08L 77/06* (2006.01)

(52) U.S. Cl.
USPC ........ 428/35.7; 428/34.1; 428/35.2; 428/35.8; 428/36.9; 428/36.91; 428/36.92; 525/425; 525/432

(58) Field of Classification Search
USPC ............... 428/34.1, 35.2, 35.7, 35.8, 36.9, 428/36, 91, 36.92; 525/425, 432
See application file for complete search history.

(56) References Cited

U.S. PATENT DOCUMENTS

| | | | |
|---|---|---|---|
| 5,300,572 | A | 4/1994 | Tajima et al. |
| 5,747,548 | A | 5/1998 | Bradt et al. |
| 5,985,389 | A | 11/1999 | Dalton et al. |
| 6,239,233 | B1 | 5/2001 | Bell et al. |
| 6,444,283 | B1 | 9/2002 | Turner et al. |
| 6,500,895 | B1 | 12/2002 | Bastiiaens et al. |
| 6,689,437 | B1 | 2/2004 | Ubara et al. |
| 2004/0013833 | A1 | 1/2004 | Lee et al. |
| 2006/0122306 | A1 | 6/2006 | Stafford et al. |

FOREIGN PATENT DOCUMENTS

| | | |
|---|---|---|
| EP | 0964031 B1 | 12/1999 |
| EP | 1063070 A3 | 12/2000 |
| GB | 1218691 | 1/1971 |
| IN | 172789 | 11/1993 |
| JP | 63-213529 A1 | 9/1988 |
| JP | 3-193325 A | 8/1991 |
| JP | 3281246 A | 12/1991 |
| JP | 08-208950 A | 8/1996 |
| JP | 2663578 B2 | 6/1997 |
| JP | 10-7893 A | 1/1998 |
| WO | 9323474 A1 | 11/1993 |
| WO | 0109245 A1 | 2/2001 |
| WO | 2005/023530 A1 | 3/2005 |
| WO | 2005110694 A2 | 11/2005 |
| WO | 2006/079044 A2 | 7/2006 |

*Primary Examiner* — Ana Woodward
(74) *Attorney, Agent, or Firm* — Edwin A. Sisson, Attorney at Law, LLC

(57) ABSTRACT

A polymer composition and wall of a container made from such composition is set forth comprising a polyamide and polyester and a sufficient amount of an interfacial tension reducing agent such that the polyamide domains stretch disproportionately to the amount of stretch experienced by the polyester both with and without a cobalt salt.

8 Claims, 5 Drawing Sheets

POLYAMIDES AND POLYESTERS BLENDED WITH A LITHIUM SALT INTERFACIAL TENSION REDUCING AGENT

PRIORITY AND CROSS REFERENCES

This patent application claims the benefit of the priority of U.S. Provisional Patent Application Ser. No. 60/725,085 filed Oct. 7, 2005 and U.S. Provisional Patent Application Ser. No. 60/827,147 filed Sep. 27, 2006. The teachings of these provisional patent applications are incorporated herein by reference.

FIELD OF INVENTION

This invention relates to the stretched wall of a container for packaging.

BACKGROUND OF THE INVENTION

United States Patent Applications 2002/0001684 (Jan. 3, 2002), 20030134966 (Jul. 13, 2003) and 20050106343 (May 19, 2005), all of which have a common inventor Kim, teach a composition of PET (A), a polyamide, MXD6 nylon (B), with cobalt octoate. The Kim series of applications teach that when the PET/MXD6/Cobalt octoate composition is injection molded into a preform (parison) and then oriented (stretched) into a blown bottle, the resultant bottle is hazy. The Kim applications also identify the cause of the haze. According to Kim, the haze is caused by the MXD6 domains dispersed into the PET which upon orientation have been stretched to the point where the size of the domains are greater than the wavelength of light.

Kim et al teaches that smaller domains reduce the haze caused by the previously large domains. One of ordinary skill knows there are two ways to have smaller domains in the stretched bottle. One is to reduce the size of the starting domains in the preform or parison, the other is to not orient or stretch the bottle as much. The solution selected in the Kim series of applications to replace the injection blow process of making the preform/parison and subsequently orienting (stretching) the preform into a blown bottle with a much lower stretch process called extrusion blow.

The Kim applications also teach that a container made with PET/MXD6/Cobalt octoate exhibits higher oxygen barrier (lower permeation rate) presumably due to the well known ability of the cobalt octoate to catalyze the reaction of MXD6 nylon with oxygen. While Kim et al, therefore teaches that reducing the size of the MXD6 domains as a way to reduce the haze in stretched containers, it does not teach how to solve the haze in an injection blown container or how to reduce the size of the domains in an injection blown container, presumably because this was already known in the art prior to the invention of Kim.

JP-2663578-B2 (Oct. 15, 1997) to Yamamoto et al identifies the same problem as the Kim applications with the same composition. Yamamoto et al discloses that a hazy stretch blown bottle is created when a composition of polyester (A) and MXD6 nylon (B) is injection molded into a parison (preform) and oriented (stretched) into a bottle. Recall that Kim et al teach that this haze is cause by large domains and the only difference being that the bottle of Kim et al contains cobalt octoate.

Yamamoto et al, then teaches that the haze in the PET/MXD6 injection blown bottle may be eliminated by incorporating a third polyester component (C) wherein the third polyester component has 5-sodium sulfoisophthalate derived from 5-sodium sulfoisophthalic acid in its polymer chain. The copolymerization of the 5-sodium sulfoisophthalic acid is taught in Table 3 of Yamamoto with the conclusion being: when polyester copolymerized with 5-sodium sulfoisophthalate is used as the component (C), the transparency is improved and the haze is notably reduced. One of ordinary skill would therefore solve the haze of Kim's injection molded/stretch blown bottle containing PET/MXD6/cobalt octoate by adding the polyester (C) copolymerized with 5-sodium sulfoisophthalate taught by Yamamoto et al. One would not eliminate the cobalt octoate found in the Kim applications because that would reduce the oxygen barrier of the container.

U.S. Pat. No. 5,300,572 (Apr. 5, 1994) to Tajima et al teaches how to reduce the domain size of a polyamide dispersed into a polyester. Tajima et al reduces the domain size of the polyamide by adding sodium sulfoisophthalic acid, either copolymerized into the backbone of polyester (A) or as a third component (C) which is a polyester copolymerized with the sodium sulfoisophthalic acid. Since the Kim applications teaches that reducing the size of the polyamide domains solves the haze one of ordinary skill wishing to make an injection molded/stretch blown bottle containing PET/MXD6/Cobalt octoate would either use a PET copolymerized with sodium sulfoisophthalate derived from sodium sulfoisophthalic acid for the A component as taught by Tajima et al or add a polyester (C) copolymerized with sodium isophthalate as taught by Yamamoto et al. Again, one would not eliminate the cobalt octoate of Kim et al because that would reduce the increased oxygen barrier of Kim et al.

WO 2005/023530 (Mar. 17, 2005) to Mehta et al teaches that a cobalt salt is essential when injection molding a preform (parison) comprising the composition of Kim et al [a polyester (A), a polyamide such as MXD6 (B)], and in the presence of an ionic compatibilizer such as 5-sodium sulfoisophthalic acid or 5-sodium sulfoisophthalate. Mehta et al and Kim et al even use the same cobalt salt—cobalt octoate. According to Mehta et al, a large amount of yellow colour is created when combining the polyester (A), with polyamide (B) in the presence of an ionic compatibilizer (C) and the use of the cobalt octoate also taught in the Kim applications prevents that colour formation.

While the use of cobalt may alleviate colour, it inherently creates an active barrier package. There are other active barrier mechanisms, such as oxidizing an elemental metal in the wall of the container. Since there are packaging applications which do not benefit and are in fact harmed by an organic scavenger or need a less powerful active package; there exists, therefore, the need for an MXD6/polyester ionic compatibilizer where cobalt is not necessary to prevent the detrimental colour formation noted in Mehta et al.

SUMMARY OF INVENTION

This invention discloses a composition and a container wall made from that composition wherein the container wall comprises a stretched layer, which could be a single layer (mono-layer), wherein the layer is comprised of a crystallizable polyester with at least 85% of the polyester's acid units derived from terephthalic acid or the dimethyl ester of terephthalic acid or 2,6 naphthalate dicarboxylic acid or its dimethyl ester, a polyamide with at least 85% the polyamide's polymer chain being the reaction of amino caproic acid with itself, or the reaction product of A-D where A is a residue of dicarboxylic acid comprising adipic acid, isophthalic acid, terephthalic acid, 1,4 cyclohexanedicarboxylic acid, resorcinol dicarboxylic acid, or naphthalenedicarboxylic acid, or a mixture thereof and D, where D is a residue of a diamine comprising m-xylylene diamine, p-xylylene diamine, hexamethylene diamine, ethylene diamine, or 1,4 cyclohexanedimethylamine, or a mixture thereof, and an interfacial tension reducing agent wherein the polyamide is dispersed into the polyester and the interfacial tension between the polyester and the polyamide is such that the average diameter of the particles of the polyamide dispersed in the polyester is less than 150 nm and the particle size measurement is conducted on the layer at the region selected from the group consisting of an unstretched portion of the layer and a portion of the layer prior to stretching.

The invention further discloses that the interfacial reducing agent is selected from the group consisting of functionalized and non-functionalized lithium sulfonates, hydroxyl terminated polyethers, cyclic amides and polyethers, with lithium sulfoisophthalate being a particularly useful lithium interfacial tension reducing agent.

An effective amount of lithium sulfonate, in particular, lithium sulfoisophthalate (derived from 5-sulfoisophthalic acid monolithium salt), is about 0.05 to 0.1 mole percent, with an optimal amount being with the range of about 0.1 to about 2.0 mole percent, with the range of about 0.1 to about 1.1 mole percent being more optimal, and about 0.18 to about 0.74 being even better yet, with the range of about 0.18 to about 0.6 mole percent being the most optimal range.

The invention further discloses that MXD6 and PA 6 are particularly suited polyamides and that the composition or wall of the container can be free of cobalt compounds.

DETAILED DESCRIPTION OF THE INVENTION

Figure 1:
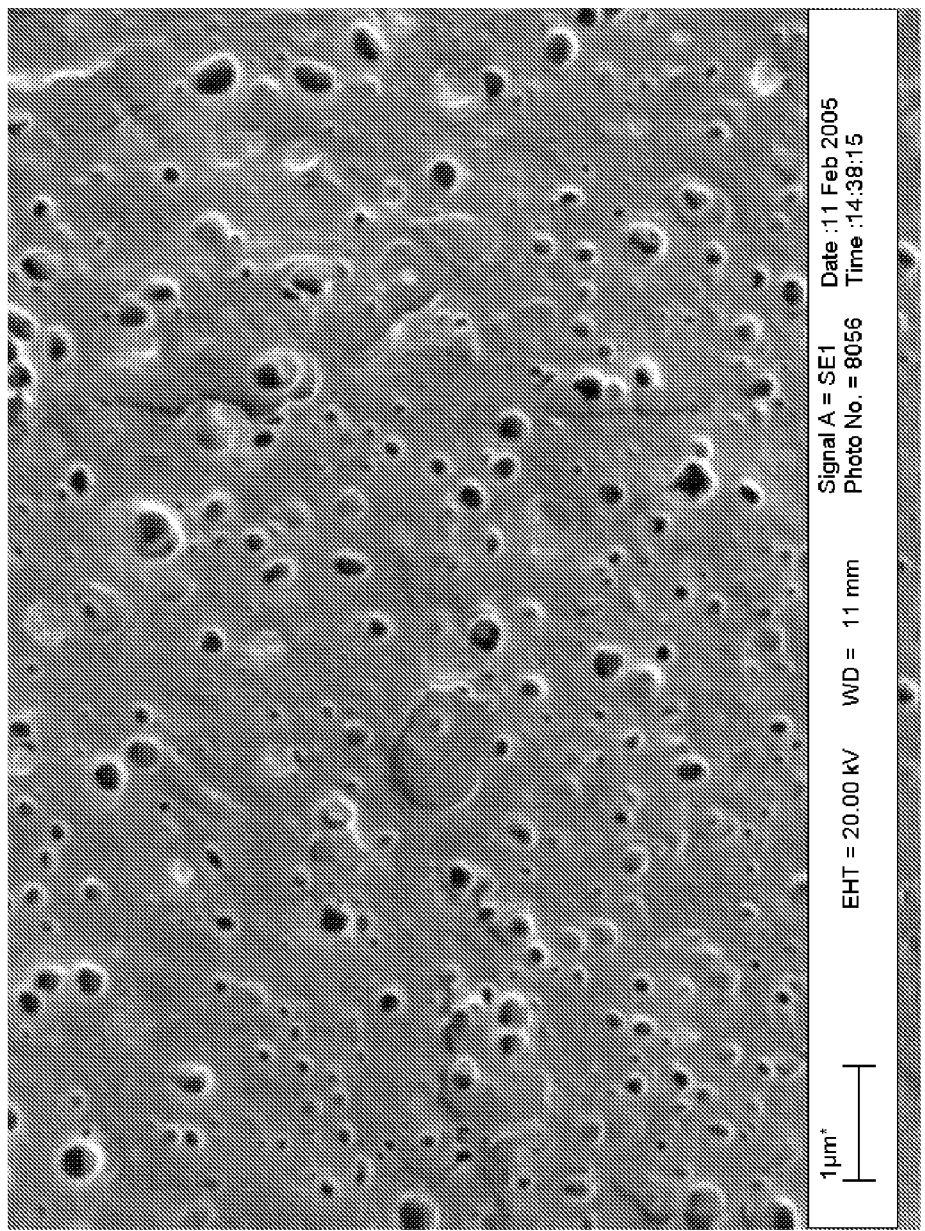
FIG. 1 depicts a scanning electron microscope photomicrograph (SEM) of polyamide domains dispersed in a polyester matrix in the absence of the interfacial tension reducing agent, such as lithium sulfoisophthalate derived from lithium sulfoisophthalic acid (LiSIPA). As detailed in the test method section, the sample was prepared by removing the polyamide with cold formic acid and exposing the sample to a scanning electron microscope.

The deficiencies of colour formation when blending polyamides, polyesters and interfacial tension reducing agents can be overcome according to the invention by the use of lithium as the metal ion in the interfacial tension reducing agent. Additionally the deficiency of the large polyamide domains found in stretched composition of polyamide, polyester and interfacial tension reducing agents can be overcome when the interfacial reducing agent is a lithium salt.

The polyamide domains of this invention exhibit a unique behaviour when the article is stretched. In the prior art systems, the relative increase in domain size very close to the overall amount the article was stretched in the same direction. If the article was stretched 5 times in one direction, the domain would also be stretched approximately 5 times in that direction. The domains of this composition do not stretch the same amount as the article. In fact, the domains exhibit a very small amount of stretch relative to the amount of stretch experienced by the article.

While not to be bound by any theory it is hypothesized that the lithium salt does not nucleate the crystallization of the polyester like the other metals (e.g. sodium) and thus the domains shrink while the stretched article is cooling. The reduced interfacial tension between the polyamide and polyester coupled with the stretch characteristics increases the dispersion of the polyamide in the polyester and the average domain size of the dispersed polymer in an unstretched portion of an article comprising the composition is less than 125 nm, with better results at less than 100 nm, even better results with the average domain size being less than 75 nm, and with domains less than 60 nm being the most optimal average domain size in the unstretched portion of the container wall.

The stretch phenomenon can be characterised by the percent stretch which is defined as the stretch ratio of the polyamide domains divided by the stretch ratio of the matrix (polyester) in the same direction. Theoretically this should be 100%, in that the domains stretch the same amount as the polyester. However, when the lithium salt is used, the percent stretch is often less than 75%, with many observations less than 50%, and in one instance less than 30%. It is believed that the lower the percent stretch, the better.

This invention also provides for a blend of a crystallizable polyethylene terephthalate or its copolymers, a polyamide (in particular MXD6 or nylon-6) and a separate interfacial tension reducing agent to form the stretched wall of a container. The separate interfacial tension reducing agent could be a metal salt of sulfonated polystyrene or a metal salt of sulfonated polyester.

This invention provides for a modified polyester, in particular a crystallizable polyethylene terephthalate or its copolymers, blended with a polyamide, in particular MXD6 or nylon-6; or a polyester, in particular polyethylene terephthalate or its copolymers, blended with a modified polyamide, in particular MXD6 to form the stretched wall of a container.

Any polyester or polyamide suitable for making the desired container is suitable for the current invention provided the composition comprising the polyester and polyamide has a sufficient amount of interfacial tension reducing agent either as a third component or incorporated into the polyester chain, the polyamide chain. A combination of the separate interfacial tension reducing agent and a polyester or polyamide, or both being modified with an interfacial tension reducing agent are contemplated. The interfacial tension reducing agents need not be the same.

Polyesters of this invention can be prepared by polymerization procedures well-known in the art. The polyester polymers and copolymers may be prepared by melt phase polymerization involving the reaction of a diol with a dicarboxylic acid, or its corresponding ester. Various copolymers of multiple diols and diacids may also be used.

In general, the polyester polymers and copolymers may be prepared, for example, by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers. For example, in one embodiment of this invention, m-xylylene diamine polyamide (MXD6 Grade 6007 from Mitsubishi Gas Chemical, Japan) is dispersed into a polyethylene terephthalate copolymer comprised of terephthalic acid, isophthalic acid and the lithium salt of sulfoisophthalic acid.

As noted hereinabove, suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to, ethylene glycol, 1,4-butanediol, trimethylene glycol, 1,6-hexanediol, 1,4-cyclohexanedimethanol, diethylene glycol, resorcinol, 1,3-propanediol and hydroquinone.

A useful polyester is a crystallizable polyester with more than 85% of its acid units being derived from terephthalic acid. It is generally accepted that polyesters with greater than 15% comonomer modification are difficult to crystallize. However, this invention includes polyesters which would crystallize and have more than 15% comonomer content.

Polyfunctional comonomers can also be used, typically in amounts of from about 0.01 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

One suitable crystallizable polyester is polyethylene terephthalate (PET) or a copolymer modified with lithium sulfoisophthalate formed from the di-ester or di-carboxylic acid of lithium sulfoisophthalate in the approximately 1:1 stoichiometric reaction of acids, or their di-esters, with ethylene glycol. Copolymers are also suitable. Specific copolymers and terpolymers of interest are crystallizable polyesters comprising lithium sulfoisophthalate in combinations of isophthalic acid or its diester, 2,6 naphthalate dicarboxylic acid or its diester, and/or cyclohexane dimethanol. The optimal levels of lithium sulfoisophthalate are within the range of 0.1 and 2.0 mole percent based upon the acid moieties in the polymer. While greater than 2.0 mole percent is not deleterious to the intended effect, greater than 2.0 mole percent achieves little or no additional improvement.

The amount of lithium sulfonate, in particular, lithium sulfoisophthalate (derived from 5-sulfoisophthalic acid monolithium salt), is about 0.05 to 10.0 mole percent, with an optimal amount being with the range of about 0.1 to about 2.0 mole percent, with the range of about 0.1 to about 1.1 mole percent being more optimal, and about 0.18 to about 0.74 being even better yet, with the range of about 0.18 to about 0.6 mole percent being the most optimal range.

The esterification or polycondensation reaction of the carboxylic acids or esters with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Another preferred base polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the interfacial tension reducing agent such as sulfoisophthalic acid, other aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polyesters of this invention may also contain small amounts of phosphorous compounds, such as phosphates, and a catalyst such as a cobalt compound, that tends to impart a blue hue. Also, small amounts of other polymers such as polyolefins can be tolerated in the continuous matrix. While WO 2005/023530 A1 teaches the use of cobalt salts as essential to prevent colour formation, the use of cobalt salts is not necessary to reduce the colour formation when the interfacial tension reducing agent is the lithium salt, in particular lithium sulfoisophthalate derived from Lithium SulfoIsoPhthalic Acid (LiSIPA). The molecular structure of lithium sulfoisophthalic acid is:

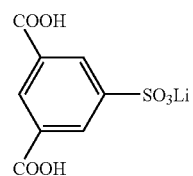

Lithium sulfoisophthalic acid (LiSIPA) or sulfonic acid lithium salt modified isophthalic acid.

As is evident from the above diagram, the lithium sulfoisophthalic acid comprises is a lithium sulfonate and comprises lithium sulfoisophthalate. The lithium sulfoisophthalate refers to the compound as it is appears incorporated into the polymer chain. This is also known as the repeating unit of lithium sulfoisophthalic acid. Lithium sulfoisophthalate therefore is the lithium sulfoisophthalic acid less one water molecule, with one hydroxyl group removed from one of the carboxyl end groups and a hydrogen removed from the other carboxyl end group. This molecule is then attached to one or more monomers ($R_1$ and $R_2$) in the polymer backbone.

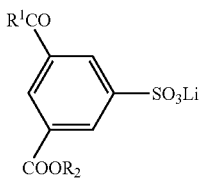

The sulfonate, in this case lithium sulfoisophthalate, is the molecule between the two R groups. Again, R could be the same monomer, in the case of PET, the R's are likely the same being the ethylene glycol moiety as reacted into the polymer chain.

After completion of the melt phase polymerization, the polymer is either made into a form such as a film or part or stranded and cut into smaller chips, such as pellets. The polymer is usually then crystallized and subjected to a solid phase (solid state) polymerization (SSP) step to achieve the intrinsic viscosity necessary for the manufacture of certain articles such as bottles. The crystallization and polymerization can be performed in a tumbler dryer reactor in a batch-type system. The solid phase polymerization can continue in the same tumble dryer where the polymer is subjected to high vacuum to extract the polymerization by-products Alternatively, the crystallization and polymerization can be accomplished in a continuous solid state polymerization process whereby the polymer flows from one vessel to another after its predetermined treatment in each vessel. The crystallization conditions are relative to the polymer's crystallization and sticking tendencies. However, preferable temperatures are from about 100° C. to about 235° C. In the case of crystallisable polyesters, the solid phase polymerization conditions are generally 10° C. below the melt point of the polymer. In the case of non-crystallisable polyesters, the solid phase polymerization temperature is generally about 10° C. below temperature where the polymer begins sticking to itself. While traditional solid phase polymerization temperatures for crystallisable polymers range from about 200° C. to about 232° C., many operations are from about 215° C. to about 232° C. Those skilled in the art will realize that the optimum solid phase polymerization temperature is polymer specific and depends upon the type and amount of copolymers in the product. However, determination of the optimum solid phase polymerization conditions is frequently done in industry and can be easily done without undue experimentation.

The solid phase polymerization may be carried out for a time sufficient to raise the intrinsic viscosity to the desired level, which will depend upon the application. For a typical bottle application, the preferred intrinsic viscosity (I.V.) is from about 0.65 to about 1.0 deciliter/gram, as determined by the method described in the methods section. The time required to reach this I.V. from about 8 to about 21 hours.

In one embodiment of the invention, the crystallizable polyester of the present invention may comprise recycled polyester or materials derived from recycled polyester, such as polyester monomers, catalysts, and oligomers.

The term crystallizable means that the polyethylene terephthalate can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

The polyamides which could be modified or unmodified that are suitable for this invention can be described as comprising the repeating unit amino caproic acid or A-D, wherein A is the residue of a dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof.

These polyamides can range in number average molecular weight from 2000 to 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

Those skilled in the art will recognize many of the combinations as well known commercially available polyamides. The reaction product of the residue of sebacic acid with hexamethylene diamine is nylon 6, 10 and the reaction product of the residue of adipic acid and hexamethylene diamine is nylon 6, 6. Nylon 6, 12 is another nylon which benefits from the invention. Nylon 6 is a special type of polyamide which is made by the opening of caprolactam and then polymerizing the resulting amino caproic acid which has a formula of $H_2N$—$(CH_2)_5$—COOH. One useful polyamide is the reaction product of the residues of adipic acid and m-xylylene diamine, known as poly-m-xylylene adipamide. This product is commercially known as MXD6 or nylon MXD6 and can be purchased from Mitsubishi Gas Chemical Company, Japan.

The modified polyamide would have a 0.01-15 mole percent of the respective acid or diamine replaced with an interfacial tension modifying compound such as sulfonated isophthalic acid. U.S. Pat. No. 3,328,484 the teachings of which are incorporated by reference, herein, describes such modified co-polyamides.

The preferred amount of polyamide is between 1 and 15 parts per 100 parts of the polyester plus polyamide, preferably between 3 and 8 parts per 100 parts of the polyester plus polyamide, with the most utility occurring between 4 and 7 parts of polyamide per 100 parts of polyester plus polyamide.

The preferred composition contains at least one interfacial tension reducing agent which reduces the interfacial tension between the polyester and the polyamide. In order to understand the role of the interfacial tension reducing agent, it is necessary to understand the role of the interfacial tension reducing agent plays in the polyester-polyamide dispersion.

The polyester-polyamide dispersion can be described as a multi-phase system consisting of a dispersed polymer and a matrix phase. The dispersed polymer is discontinuous, with many small particles scattered throughout the matrix polymer. The matrix polymer is a continuous phase, where the polymer is not broken up into discrete units, but is constantly in contact with itself. In other words, there is usually only one matrix phase, but many particles of the dispersed polymer. Technically, therefore, the dispersed component may be considered many phases, as each particle is its own phase. However, in that description, each particle has the same equilibrium properties of the other particle. For the purposes of this invention, the term dispersed phase or dispersed polymer refers to the totality of discrete particles of the discontinuous component present in the continuous phase.

It is believed that the polyamide is dispersed into the polyester matrix forming discrete particles in the polyester. And, while not to be bound by any theory, it is also believed that the inferior dispersion of polyester/polyamide system is due to the high interfacial tension (IFT) existing between the two polymers.

For a closed system (see An Introduction to the Principles of Surface Chemistry, Aveyard, R. and Haydon, D. A. 1973), the differential expression for the internal energy U of the system has been described as $$dU=dQ+dW$$

where dQ is the heat taken up by the system and dW is the change in work. The relation is then isolated for dW which reduces the equation to $$dW=-pdV+\gamma dA$$

where dV is the change in volume and γ is the interfacial tension, and dA is the change in interfacial area (the area of the interface between the two components). In the liquid-liquid system, such as exists with the mixture of melted polyester/polyamide, there is no volume change (dV=0), and the equation reduces to the change in work as a function of the interfacial tension and the change in interfacial area.

$$dW=\gamma dA$$

The lower the interfacial tension, therefore, the higher the area of contact between the two materials. A higher area of interfacial contact for a given amount of material is only achieved by creating smaller particles of the dispersed material into the matrix material. A higher interfacial contact area requires a smaller diameter, and consequently a greater number of particles. The effectiveness of the interfacial tension reducing agent can be directly established by the average particle size. The lower the average dispersed particle size, the lower the interfacial tension and the more effective the interfacial tension reducing agent.

This increase in surface area and corresponding decrease in domain size and subsequent increase in the number of domains is believed to increase the barrier, improve the aesthetics (reduced haze) and also increase the amount of oxygen scavenging ability when the polyamide has been activated to react with oxygen. This activation is often done by exposing the polyamide to a transition metal catalyst, usually in its positive valence state.

Other ways to increase the surface area exist. These include increasing the amount of shear during the melt blending process, varying the viscosity ratios, attempting to cross link or graft the materials. While the inventors are familiar with all of the above techniques, no technique has been as successful as directly modifying at least one of the polymers to reduce the interfacial tension between the two polymers.

The interfacial tension between two polymers in their liquid state is difficult to determine due to the high temperatures involved. One technique is to use a spin tensiometer. However, in the absence of sophisticated equipment it is much easier to make two separate polymer dispersions, one modified, the other unmodified, using the same amount of work (torque, screw design, temperatures) and compare the difference in average particle size of the dispersed material.

The immediate effect of the reduction in interfacial tension can be seen by reduced haze in the stretched article or by comparing the average polyamide particle size of an unmodified polyester-polyamide dispersion with a modified polyester-polyamide system. This test easily determines whether the interfacial tension has been reduced.

The composition should have a sufficient amount of interfacial tension reducing agent added either separately or reacted into the backbone of the polyester, polyamide or both. A combination of the separate interfacial tension reducing agent and a polyester or polyamide, or both being modified with an interfacial tension reducing agent are contemplated. The interfacial tension reducing agents need not be the same.

Preferably, the interfacial tension reducing agent is a co-monomer reacted with the polymer. To be a co-monomer, the interfacial tension reducing agent is functionalized with at least one end group which allows the interfacial tension reducing agent to react with at least one of the other polymers or polymer co-monomers in the composition.

In the case of polyesters, these can be the polar co-monomers used to create PET ionomers. In the case of polyamides, the interfacial tension reducing agent can be the polar co-monomers used to create polyamide ionomers. Examples of these co-monomers are the monovalent and/or divalent salt of the respective sulfonate described in U.S. Pat. No. 6,500,895 (B1) the teachings of which are incorporated herein. Also included are the monovalent and bivalent metal salts described in the following formulas found in Japanese Patent Application 0 3281246 A, the teachings of which are incorporated herein.

In general, the interfacial tension reducing agent exists in functionalized form of the form X—R, where X is an alcohol, carboxylic acid or epoxy, most preferably a dicarboxylic acid or diol and R is R is —SO₃Li, —COOLi, —OLi, —PO₃(Li)₂, and X—R is copolymerized into the polyester polymer to modify the interfacial tension. The amount of X—R needed will exceed 0.01 mole percent with respect to the total number of respective dicarboxylic acid or diol moles in the polymer. It is possible for X—R to include both a diol or dicarboxylic acid. In that case, the mole percent is based upon the total number of moles of respective diols, dicarboxylic acids, or polymer repeating units.

The functionalized interfacial tension reducing agent may contain 2 or more R groups. R may also be combined directly to the aromatic ring of X, which could be a diol, a dicarboxylic acid, or a side chain such as a methylene group.

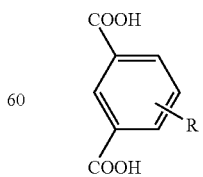

Where R is —SO₃Li, —COOLi, —OLi, —PO₃(Li)₂

Here, the dicarboxylic acids represented by X may be in the ortho, meta, or para structures. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

Aliphatic dicarboxylic acids such as oxalic acid, malonic acid succinic acid, glutaric acid, adipic acid, pimelic acid, suberic acid, azelaic acid, sebacic acid, etc. Cycloaliphatic dicarboxylic acids such as cyclohexanedicarboxylic acid and one or more species of these can be used. Specifically contemplated are mixtures of the dicarboxylic acids as well.

X can also represent an alcohol, preferably a diol of the structure:

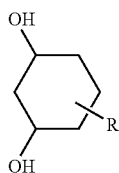

Where R is —SO$_3$Li, —COOLi, —OLi, —PO$_3$(Lli)$_2$

The diols represented by X may be for instance aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cycloheaxanediol, cycloheaxanedimethanol and one or more species in combination can be used. Among these, ethylene glycol, diethylene glycol and cyclohexanediol are preferred.

Other functionalized interfacial tension reducing agents which can be used to decrease the interfacial tension include hydroxyl terminated polyethers, such as polyethylene glycol (Carbowax) and cyclic amides such as ethoxylated dimethyl hydantoin. In addition, polyesters can be reacted with epoxy terminated compounds, including epoxy terminated polyethers, to produce a polyether side chain attached to the polymer.

As used in this specification, the term interfacial tension reducing agent refers to the agent as it is exists without being incorporated into the backbone of a polymer and as it has been incorporated into the backbone of the polymer, Of the metal salts, it has been found that lithium, a monovalent metal, performs much better than sodium. In fact, the lithium salt imparts very little, if any, haze in the polyester matrix when blended with MXD6 and produces a dispersion with average domains lower than levels previously measured. Unlike other systems presented in the art, the lithium salt exhibits a very little increase in haze with increased levels of MXD6, and in fact at some levels no increase in haze was measured. Also, lithium shows dramatically lower yellow colour when melt blended with the polyamide thus eliminating the need for cobalt salt or zinc as described in WO 2005/023530A1, the teachings of which are incorporated herein. In fact, as described below, the lithium sulfoisophthalate without a cobalt compound has better colour than the sodium isophthalate blended with the same amount of MXD6 in the presence of a cobalt salt.

Of the salt forms, the di-carboxylic acid, di-ester, or pre-reacted low molecular weight oligomers and other building blocks such as the bis-hydroxyethyl ester of lithium sulfoisophthalate are preferred. It is also possible that the interfacial tension reducing agent, in this case the lithium sulfonate, occur in the diol form as well. Possible alternatives are isethionic acid. It has even been proposed to place the sulfonate at the end of the polyester molecule. This could be accomplished by reacting or copolymerizing the polyester with the sulfonated salt of benzoic acid or other monofunctional species either in the melt reactor or in an extruder. In this instance the interfacial tension reducing agent reacted with the backbone of the polymer would be lithium sulfobenzoate. One way to describe the various lithium salts is to use the term functionalized lithium sulfonate to describe a compound of the form R—SO$_3$Li, where R is an aliphatic, aromatic, or cyclic compound with at least one functional group that allows the functionalized lithium salt to react with the polyester or polyamide, or their respective monomers or oligomers. Functionalized lithium sulfonates included in this invention are the lithium salts of sulfonated comonomers, including aliphatic and aromatic alcohols, carboxylic acids, diols, dicarboxylic acids, and multifunctional alcohols, carboxylic acids, amines and diamines. Lithium sulfoisophthalic acid is a functionalized lithium sulfonate as is lithium sulfobenzoic acid.

In order to be reacted into either polymer, the modifying agent must have at least one functional group. These functional groups are carboxylic acid (—COOH), alcohol (—OH), the ester of the carboxylic acid, epoxy termination, the diamine, or amine end groups.

Because a high I.V. polyester would have two functional end groups per polymer chain, a high I.V. polyester containing lithium sulfoisophthalate in its backbone is an interfacial reducing agent when blended with a polyamide and polyester without lithium sulfoisophthalate. Should the high I.V. polyester have both polymer chain ends terminated with non-functional groups, then the polyester would be considered a non-functionalized or non-functional interfacial tension reducing agent.

The non-functionalized interfacial tension reducing agents are those compounds which contain a polar group, in particular the lithium salt, but do not have any functional end groups which allow the interfacial tension reducing agent to react with the polyester or polyamide. The lithium salt of sulfonated polystyrene is an example.

As taught below, the polymer is preferably modified with the interfacial tension reducing agent. This modification is done by copolymerizing the interfacial tension reducing agent into the polymer chain. As taught in Example 6, the compartmentalized pellet, the interfacial tension reducing agent can be incorporated into the polyester and then blended with an unmodified polyester and polyamide to produce the composition.

Levels of the interfacial tension reducing agent needed to decrease the interfacial tension range from 0.01 mole percent to 15 mole percent with respect to the total number of moles of the respective acid or diol moiety. For example, a typical homopolymer polyester has 100 mole percent terephthalic acid and 100 mole percent ethylene glycol. A polyester containing 5 mole percent of the ionic dicarboxylic acid co-monomer would be derived from 95 moles of terephthalic acid, 5 moles of lithium sulfonate (such as lithium sulfoisophthalic acid) and 100 moles of ethylene glycol. Similarly, it may be advantageous to add another comonomer such as isophthalic acid. For example, a 2 mole percent isophthalate polymer would contain 93 moles terephthalic acid, 2 moles of isophthalic acid, 5 moles of functionalized lithium sulfonate and 100 moles ethylene glycol to make 100 moles of polymer repeat unit.

In the three component blend system, the moles of acid are the moles of acid in the modified polymer plus the moles of acid in the unmodified polymer.

It is also well known that di-ethylene glycol is formed in-situ in the manufacture of polyester and about 2-3 percent of the total moles of glycol will be diethylene glycol. Therefore, the composition is 97 mole percent ethylene glycol and 3 mole percent di-ethylene glycol.

The amount of interfacial tension reducing agent is determined empirically. Generally, a small amount is needed and approaches a critical amount beyond which additional amounts have no effect. In the surface science field, this amount is referred to as the Critical Micelle Concentration (CMC). As seen in the examples, a small amount of sulfonated material has a significant effect, but at a certain point, around 0.4 or 0.5 mole percent in the case of lithium sulfoisophthalic acid, no increase in effectiveness is seen. Levels above the CMC would be the functional equivalent of the CMC as it pertains to reducing the interfacial tension of the polyester-polyamide. Unlike other salts, the lithium salt, in particular shows an optimum level at approximately between 0.3 and 1.0 moles per 100 moles polymer repeat unit. This can also be expressed as 0.4 to 1.0 mole percent of the acid or glycol moiety to which the lithium salt is attached.

Examples of modified polyesters employed in the present invention are those prepared by virtually any polycondensation polymerization procedure. The traditional techniques can be divided into the ester, acid, and modified processes. In the ester process, the dimethyl ester of the carboxylic acid or acids is reacted with the glycol or glycols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer would start with these ratios: 98 moles of dimethyl terephthalate, 2 moles of dimethyl sodium salt of sulfoisophthalate and 220 moles of glycol, typically ethylene glycol. Of the 220 moles of glycol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, lithium sulfoisophthalic acid could be copolymerized into polyethylene terephthalate as the acid, with two carboxylic end groups, the dimethyl ester of the carboxylic acid, or the bishydroxy ester of the dimethyl ester or even very low molecular weight oligomers of a glycol acid polymer where the acid moieties are at least in part, the sulfoisophthalate salt.

The phrase "copolymerized salt of the acid" should not limit the claim to only using the acid form, but should be read to mean the compound is one of the acid groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent lithium sulfoisophthalic acid into the polyester, means that the lithium sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into polyester refers to a polyester containing the lithium sulfoisophthalate whether that lithium sulfoisophthalate was incorporated using but not to limited to lithium sulfoisophthalic acid, lithium sulfobenzoic acid, the dimethyl ester of lithium sulfoisophthalic acid, the methyl ester of lithium sulfobenzoic acid, the di-alcohol of lithium sulfoisophthalate, the lithium sulfohydroxy benzene, the lithium salt of hydroxy benzene sulfonic acid, or oligomers or polymers containing the lithium sulfoisophthalate.

The phrases "and derivatives" and "and its derivatives" refer to the various functionalized forms of the interfacial reducing agent which can be copolymerized into the polymer. For example, lithium sulfoisophthalate "and its derivatives" refers collectively and is not limited to lithium sulfoisophthalic acid, the dimethyl ester of lithium sulfoisophthalic acid, the bis-hydroxyethyl ester of lithium sulfoisophthalic acid, the di-alcohol of lithium sulfoisophthalate, low molecular weight oligomers, and high I.V. polymers containing lithium sulfoisophthalate in the polymer chain.

The same nomenclature applies to the glycol or alcohol.

In the acid process, the starting materials are the di-carboxylic acids, with water being the primary by-product. The charge ratio in a typical acid process is 98 moles terephthalic acid, 2 moles of a metal salt of sulfoisophthalic acid (e.g. lithium sulfoisophthalic acid—LiSIPA), and 120 moles of glycols, typical ethylene glycol. After reaction of the glycols with the acids, the material is subjected to the same polymerization process conditions as the ester process.

The modified processes are variations of either process: combining the intermediary product at certain steps. One example is to pre-polymerize the raw materials without the interfacial tension reducing agent to a low molecular weight. In the case of the examples described below, the molecular weight of the low molecular weight polyester was typically in the range 0.096 to 0.103 dl/g having a carboxyl end group number ranging from 586 to 1740 equivalents per 1,000,000 grams of polymer. Obviously, the molecular weight could be easily varied without undue experimentation as it has been for many years by those of ordinary skill in the art when optimizing the addition point for their additives.

Another example of a variation of is to use the acid process with just terephthalic acid to produce its low molecular weight intermediate and the ester process used to produce the bis-hydroxyethyl ester of the homopolymer sulfonated polyester. These two intermediates are then combined and polymerized to a copolymer. Another variation is to add the finished modified polymer to the melt reactor and let the melt process depolymerise the modified polymer and then form a copolymer. While the three component system, of PET, PET—ionomer, and polyamide is not nearly as effective as the random copolymer the three component system is considered a part of this invention. The copolymer is a preferred embodiment of the invention.

Another technique for manufacturing the modified polymer is to completely trans-esterify a modified polyester with a large amount of interfacial tension reducing moieties into a unmodified polyester to create a randomly structured modified copolymer. This can be done using traditional techniques using a long residence time and/or high temperature extrusion.

This same effect can be accomplished using the multi-compartment pellet technique as described in WO 2005/110694 titled "Compartmentalized Resin Pellets", the teachings of which are incorporated herein. This would involve using the core-sheath design wherein the core is the hydrophilic polymer and the sheath is the unmodified, more hydrophobic, polyester. The products are then combined into the composition during melt fabrication of the article. This was the procedure used in Example 6.

WO 2005/110694 titled "Compartmentalized Resin Pellets", the teachings of which are incorporated herein, describes the zoned or compartmentalized pellet as the preferred structure for the polyamide/polyester pellet. The preferred pellet structure is either a polyamide core with a sheath of the reduced interfacial tension modified polyester, or a modified polyamide core with a sheath of polyester, or both the polyamide and polyester have been modified. It is recognized that the core or sheath could contain some amount of the other ingredient as well.

As taught in the examples of the U.S. patent application Ser. No. 11/130,961, this pellet can then be solid phased polymerized without the attendant colour shift. The polyamide is then melt blended with the polyester when the article is made, thus taking advantage of the invention in the article. In fact, the lowest average dispersed particle size of 57 nm was obtained using a compartmentalized pellet structure.

Other methods of incorporating similar co-monomers are listed in U.S. Pat. Nos. 3,936,389, 3,899,470, 5,178,950, and United States Statutory Invention Registration H1760, the teachings of all of which are incorporated herein.

The polyester and polyamide are melt blended and then injection molded, pelletized or formed into a film. Analysis of the dispersion at this point shows the polyamide dispersed into the polyester matrix phase. There are many techniques to analyse the dispersion properties.

The domain size of the dispersed polymer is measured in the unstretched area. The unstretched area can exist in an unstretched area of the wall, such as the thread, neck, and sealing portions or it can be measured on the article before stretching. Measuring the size of the dispersed particles in the article before stretching the article yields the same value as measuring the size in the unstretched portion after stretching. Therefore, if the stretched wall does not have an unstretched portion, the size of the dispersed particles prior to stretching can be used. In many instances, the measurement was made on the preform or parison prior to stretching.

Figure 3:
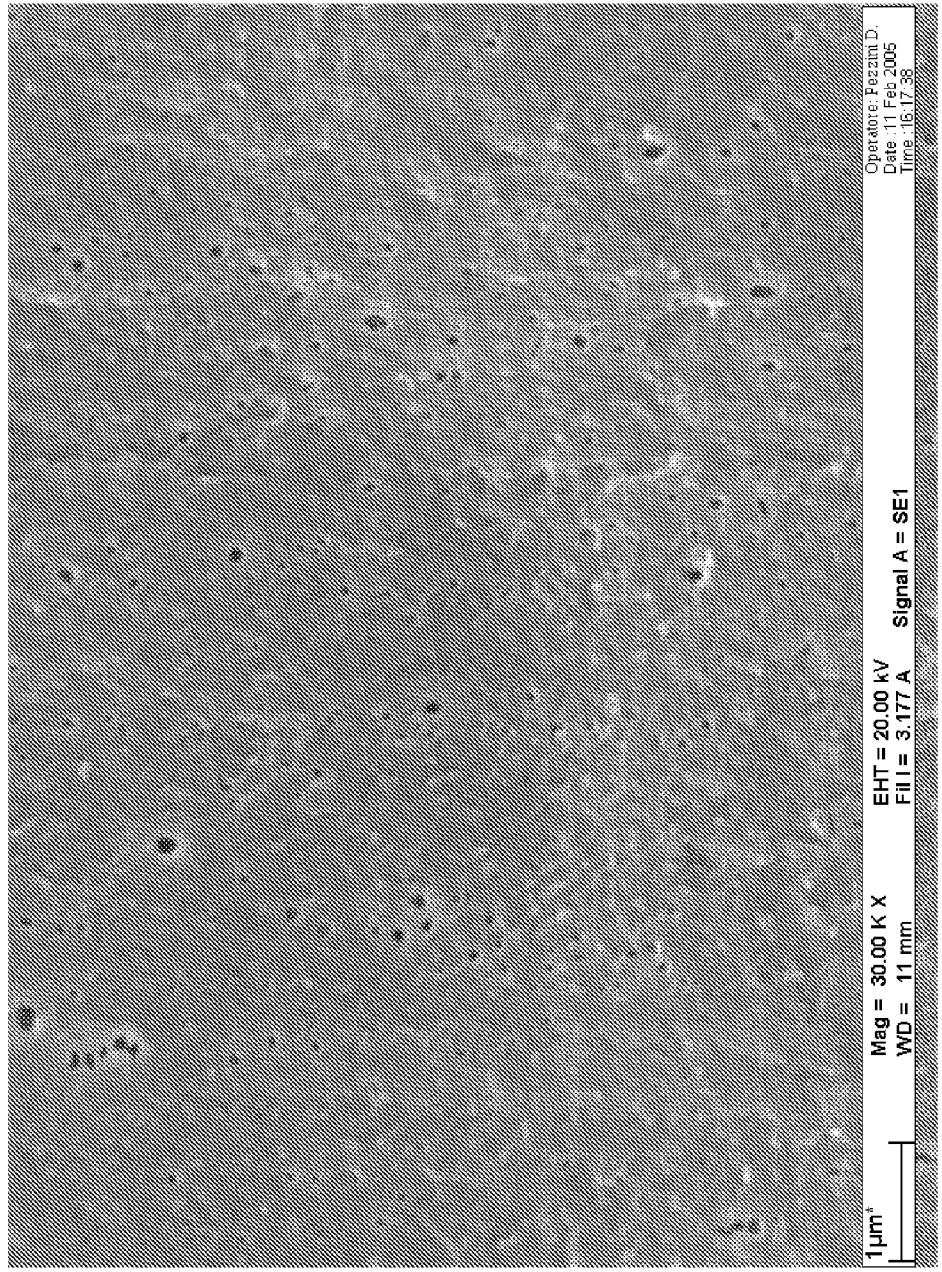
FIG. 3 depicts a scanning electron microscope photomicrograph of polyamide domains dispersed into a polyester matrix in the presence of an interfacial tension reducing agent—lithium sulfoisophthalate derived from lithium sulfoisophthalic acid (LiSIPA). As detailed below, the sample was prepared by removing the polyamide with cold formic acid.

In one example, a fractured sample is treated with cold formic acid to remove the polyamide from the PET and the sample subjected to scanning electron microscopy (SEM). Based upon contrast, the domains where the polyamide once was can be readily determined and measured. (See FIGS. 1 and 3).

Since the molded sample is unstretched, the particles are present as spheres. The SEM picture can be analyzed either manually or with various computer programs. The average particle size can then be easily calculated from the picture. The average can be determined by summing the diameters of all the particles in the picture and dividing by the number of particles in the picture. Alternatively, a statistically significant sample size could be used instead of all the domains in the populations.

Figure 2:
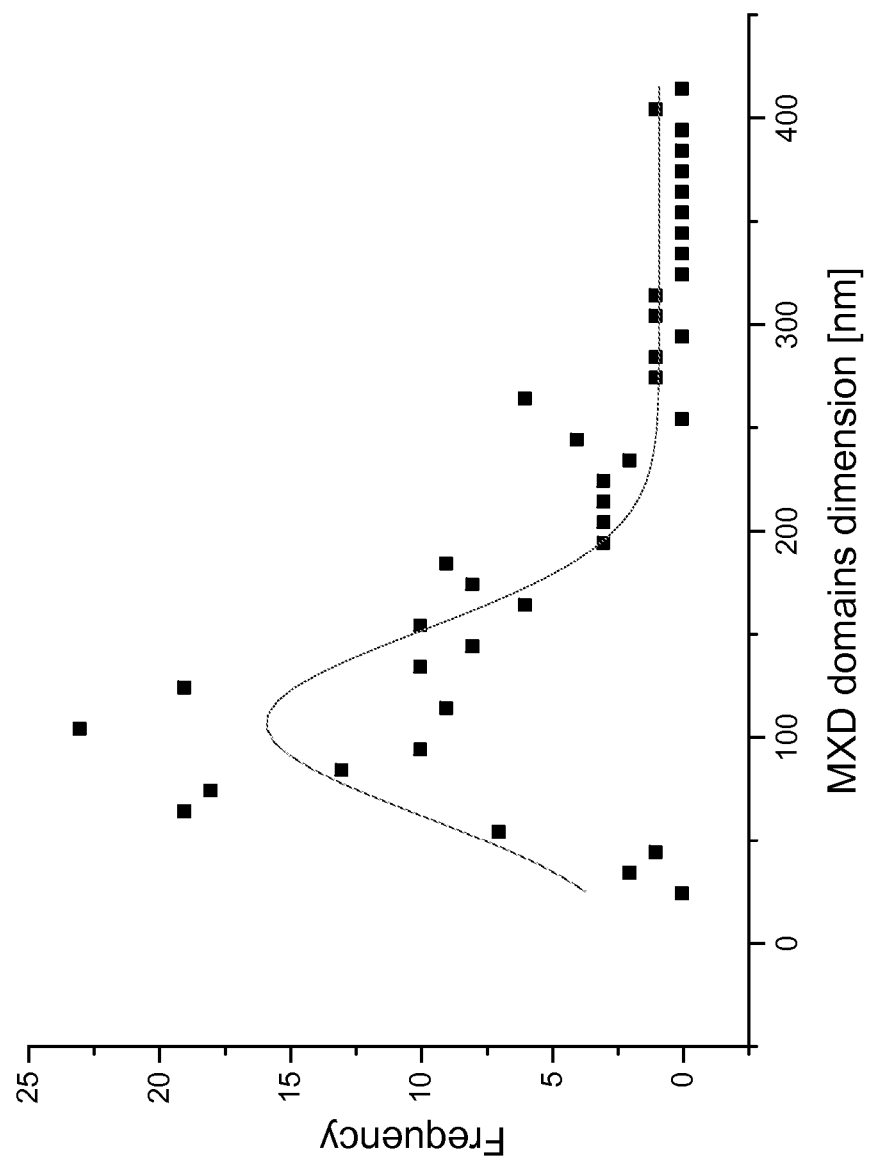
FIG. 2 depicts the graphical representation of the distribution of the domains corresponding to the polyester-polyamide system of FIG. 1.
Figure 4:
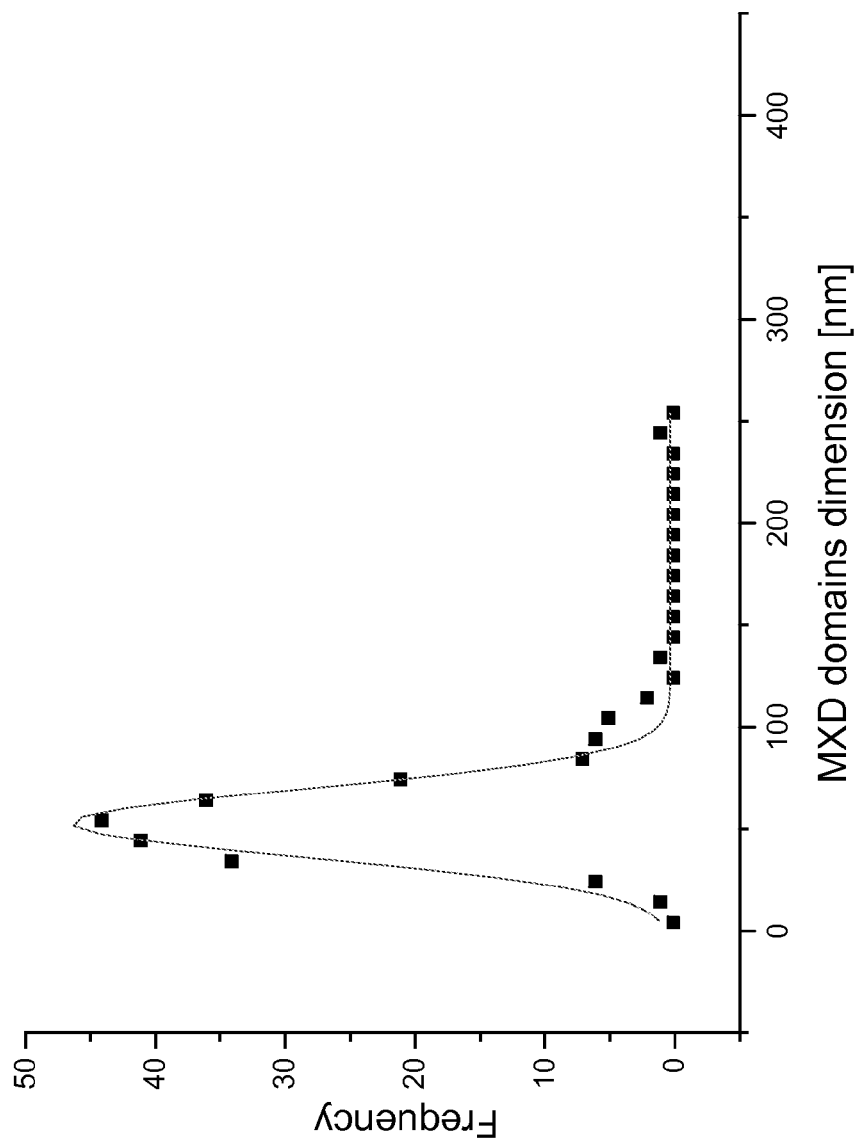
FIG. 4 depicts the graphical representation of the distribution of the domains corresponding to the polyester-polyamide system of FIG. 3.

Similarly, a distribution analysis can be done (FIGS. 2 and 4), by making a histogram of the number of particles corresponding to a given diameter. The data can also be normalized to a make a particle density function. Such normalization would be done by taking the number of particles per area observed and then multiplying or dividing by the factor desired to normalize the results.

For example, if one wanted to normalize the observation of 250 particles per 100 square nano-meters to the number of particles for 1000 square nano-meters, one would multiply 250 by 10, which is the factor of 1000 square nano-meters divided by 100 square nano-meters.

The interfacial tension between two polymers in their liquid state is difficult to determine due to the high temperatures involved. One technique is to use a spin tensiometer. However, in the absence of sophisticated equipment it is much easier to make two separate polymer dispersions, one modified, the other unmodified, using the same amount of work (torque, screw design, temperatures) and compare the difference in average particle size of the dispersed material.

The immediate effect of the reduction in interfacial tension can be seen by comparing the average polyamide particle size of an unmodified polyester-polyamide dispersion with a modified polyester-polyamide system. This test easily determines whether the interfacial tension has been reduced.

The viscosity difference between the modified and unmodified materials has not been found to be a significant factor. However, this difference can be accounted for by making sure that the modified and unmodified polyester have the same melt viscosities. Given the dramatic shift in particle size, the effectiveness of a particular lithium compound to reduce the interfacial tension will be readily determined.

Regardless of whether the interfacial tension has been reduced, the molded part is generally not hazy. However, once the article is stretched, the spherical domains will elongate, become ellipsoidal, and at least one diameter of the ellipse will become large enough to interfere with the visible light. Mathematically expressed, one of the diameters of the ellipse will be greater than approximately 400 nm but less than approximately 720 nm; corresponding to the wavelength range of visible light.

Stretching occurs when the molded article, film or fiber is subjected to a force and pulled or elongated. Generally, the article is heated to a temperature below the melting point of the matrix polymer and then pulled in one or two, or in the case of a bubble, three directions. A fiber or a type of film is an example of uni-axial stretching. A fiber is pulled in the direction of its length to build strength. A film will be placed in a machine which has a sequence of gears that move progressively faster, thus stretching the film between each gear or other attaching mechanism.

In the case of bottles, biaxially oriented films, or blown films, the article is pulled in at least two directions. In the case of a blown bottle or reheat blow or reheat stretch blow bottle, pressure such as compressed air is introduced into the article, also known as a preform or parison. The air will then expand the article to take on the shape of the blow mold surrounding the article. Depending upon the design of the article and the mold, the article will have varying degrees of stretch in the two directions.

In films, there are some techniques which simultaneously stretch the article in the machine and transverse directions. However, in industrial practice it is more common to stretch the film first one way, then the other.

It is this stretched article where the object of this invention has utility. By lowering the interfacial tension so that the particles of the dispersed polymer are extremely small, the article can be stretched to higher levels, and still maintain a reduced haze appearance because many of the stretched particles are still below 400 nm (the wavelength of light).

The amount of stretch, also known as draw, is described as the stretch ratio. In the case of a uniaxial stretch, the ratio is the length of the stretched article divided by the length of the unstretched article, where both lengths are measured in the direction of stretch. A 2 inch specimen stretched to 8 inches would have a stretch ratio of 4.

For a bi-axially stretched article, the ratio is often described as the stretch ratio of direction one multiplied by the stretch ratio of direction two. Thus an article stretched 3 times in one direction and 3 times in the other direction (usually perpendicular to the first direction) has a stretch ratio of 3x3 or 9. However, an article with a stretch ratio of 2 in one direction and 4.5 in the perpendicular direction also has a stretch ratio of 9.

Another technique to measure stretch ratio, draw ratio, or drawdown ratio is to trace or scribe a circle onto a plane of the article, measure the area of the circle, stretch the article, then measure the new area circumscribed by the enlarged circumference of the old circle. The stretch ratio is then the area of the new stretched circle divided by the area of the unstretched old circle. That stretch ratio can also be determined by using the ratio of the diameters or radii.

In the case of the three dimensional stretch, the change in volume or area of a sphere could be used to approximate the stretch ratio.

Regardless of the technique used to measure the stretch ratio, stretching the molded article causes the dispersed component to stretch as well. Even if the dispersed component does not stretch, the domain surrounding the dispersed component will elongate. If the elongation of the domain whether it is completely filled with the dispersed material or not is greater than approximately 400 nm but less that about 720 nm, then the stretched article will have an increased Hunter Haze value, where haze is the measure of the amount of light deviation from the direction of transmittance by at least 2.5 degrees.

If enough of the particles have diameters between 400 and 720 nanometers, then the haze will be detectable by the human eye. As discussed below, the standard deviation becomes equally as important as the average domain size.

It is apparent that the diameter of the dispersed particle be small enough so that when stretched, the longest dimension of the dispersed particle and the domain encompassing the particle be less than 400 nm. For an article which stretches 3 in one direction and 3 in another, the maximum particle size in the unstretched article should be 400 nm divided by 3, or 133 nm. For the article stretched 2×4.5, the particle size should be less than or equal to 400 divided by 4.5, or 89 nm. The target average diameter of the dispersed particles in the unstretched matrix phase could then be easily expressed as 400 divided by longest dimension of stretch. For example, if the final stretch dimension was 7×2, then the goal would be to modify the interfacial tension so that the average particle diameter in the unstretched article would be 400 divided by 7, or 57 nm. It is not only important that the average diameter be below a certain size, but that the distribution be narrow enough to reduce the number of dispersed particles which will exist between 400-700 nm after stretching. While reducing the average domain size is important to minimize the number of domains in the visible region, narrowing the wide distribution is also important.

Because the particles occur in a distribution, the average particle diameter is used. Given the ranges of stretch ratios, the average diameter of the dispersed particles in the unstretched container should be less than 125 nm, more preferably less than 100 nm, even more preferably less than 80 nm. For articles to be stretched into high stretch, high strength materials, average particle diameters of less than 90 nm should be used, with particle size less than 70 nm preferred, and particle size less then 60 nm even more preferred, with the best appearance occurring with an average particle diameter less than 50 nm.

What has been discovered is that when the lithium salt is used, the domains do not follow the expected behaviour. Examination of series 9 demonstrates this. The percent stretch which is defined earlier as the stretch ratio of the polyamide domains divided by the stretch ratio of the polyester matrix in the same direction can be determined as follows:

The domain stretch ratio, or stretch ratio of the domain, is the average length of the domains after stretching in the measured direction of stretch divided by the average length of the domains prior to stretching. Since the unstretched domain is spherical, any radius or direction can be used.

The stretch ratio of the polyester or matrix is the change in amount the polyester has been stretched coincident with the approximate area where the domain is measured. The easiest way to measure the stretch ratio of the polyester for the percent stretch calculation is to place a line of known length on the article in the approximate area where the stretch ratio where the domains were measured. The article is then stretched, presumably in the direction of the line and the new length of line is then measured. The stretch ratio of the polyester is the length of the stretched line divided by the length of the line before stretching. Of course, the measurements must be in same direction of stretch.

Theoretically the percent stretch should be 100% (1.0), in that the domains stretch the same amount as the polyester. However, when the lithium salt is used, the percent stretch is often less than 75%, with many observations less than 50%, and in one instance less than 30%. It is believed that the lower the percent stretch, the better. As shown in Series 9, the percent of stretch of the traditional sodium sulfoisophthalate interfacial tension reducing agent was 0.91 (91%) while the percent stretch using the lithium salt was 0.71 (71%).

The thickness of the wall of the container of this invention can range from 0.01 mm in the case of a film to the thickness of a preform which is usually less than 6.5 mm. In the case of the bottle, the stretched wall usually has a thickness of 0.2 to 0.9 mm. A container wall can also consist of layers of varying thickness, the thickness of the layers is usually between 0.02 and 0.2 mm. A monolayer, which is the preferred wall of the container, consists of one layer. A monolayer of the polyester-polyamide dispersion would consist of one layer. This does not mean that monolayer could not have a label wrapped around it. It would still be a mono-layer bottle. In contrast, the multilayer bottle would contain a least one layer of the composition.

References to the container sidewall and container wall of this invention also refer to the lid, bottom and top sides of the container, and a film that may be wrapped around the product such as meat wraps. The container wall may be completely stretched or have stretched and unstretched portions. For example, a reheat blown or injection stretch blown bottle is a container with a highly stretched portion in the middle of the wall, with the wall having successfully lower stretch until the wall is unstretched in the neck and thread areas. For clarity, the thread, neck, and sealing portions where the cap is applied are considered part of the wall of a container. In a reheat blown bottle the threads and neck area are generally unstretched. A preform or parison is also a container with at least one wall. Although an intermediate product, the preform is capable of containing a packaged content as it is closed on one end and open on the other.

A water activated oxygen scavenger may also be compounded into the composition. These oxygen scavenging compositions are well known in the literature and usually comprise oxidizable metal particles, particularly elemental iron or aluminum, and an activating component such as a water soluble salt, electrolytic, acidic, non-electrolytic/acidic or water hydrolysable Lewis acids. The activating component can either be blended or deposited upon the oxidizable metal particles. The polymer composition may also contain polyamide, in particular, poly-m-xylylene adipamide (MXD6). If one wants to just increase the passive barrier, the polyamide may be blended without the oxygen scavenging composition.

The oxygen-scavenging compositions can be added directly to the polyester or polyamide, whether modified or not, at any step where one of the polymer streams is in its liquid state such as melt polymerization, pelletizing, separate compounding or melt-fabrication operation, such as the extrusion section thereof, after which the molten mixture can be advanced directly to the article-fabrication line.

Typical values of the oxidizable metal will be from 300 to 3000 ppm by weight of the polymers in the composition.

The colour and brightness of a thermoplastic article can be observed visually, and can also be quantitatively determined by a HunterLab ColorQuest Spectrometer. This instrument uses the 1976 CIE, a*, b* and L* designation of colour and brightness. An a* coordinate defines a colour axis wherein plus values are toward the red end of the colour spectrum and minus values are toward the green end.

The b* coordinate defines a second colour axis, wherein plus values are toward the yellow end of the visible spectra and minus values are toward the blue end of the visible spectra.

Higher L* values indicate enhanced brightness of the material.

The following examples are provided for purpose of illustrating the manufacture of the composition and the composition properties and are not intended to limit the scope of the invention.

The polyester polymers used in this invention were made via extrusion and melt polymerization.

Example 1

Manufacture of Interfacially Modified Sodium Sulfonate Polymer Via Melt Polymerization A two vessel reactor train was used to manufacture the intermediate molecular weight polymer at 0.5 and 2.0 mole percent sodium sulfoisophthalate. The following example demonstrates how the polymer containing 0.5 mole percent sodium isophthalate was made. The same procedure was used for the 2.0 mole percent and higher concentrations used in the extrusion manufacture technique.

8933.0 gms of dimethyl terephthalate, 69.7 gms di-methyl sodium sulfoisophthalate, 7175 gms ethylene glycol and 261 g manganese acetate were added to the first vessel. The ingredients were heated to 214° C. at a rate of 0.4° C. per minutes and the methanol removed. After the removal of 3660 ml of methanol, the ingredients were transferred to the second vessel and the batch temperature increased to 226° C. 67 gms of phosphite stabilizer were added and mixed for 5 minutes. 140 gms of isophthalic acid were then added to the batch. After stirring for 15 minutes, 77 gms of Cobalt Acetate, and 173 gms of glycolated antimony oxide were added and the vessel placed under a vacuum of 0.13 millibar. The batch was continually agitated and the temperature increased to 256° C. The resulting polymer was discharged and pelletized after reaching the desired intrinsic viscosity. The polymer produced in this particular batch had an I.V. of 0.53 dl/gm, 14 carboxyl end group number (equivalent milligrams per gram of polymer) and a melt point of 246.9° C.

The molecular weight of the material was increased by solid phase polymerizing several melt batches in a rotating vacuum vessel. The solid phase polymerization was accomplished by placing 5 melt batches of the same molecular constituency into the vessel. The vessel pressure was reduced to 0.13 millibar, the temperature set at 225° C., and the vessel slowly rotated so the material tumbled on itself. After 12 hours of tumbling, the temperature was increased to 230° C. for 6 hours, and then increased to 235° C. for 2 hours. The pellets were then cooled and discharged. The final Intrinsic Viscosity was 0.82 dl/gm. The following batches were made according to the process of Example 1 and used in the experiments.

TABLE I

Properties of Melt Produced Material

| Mole % of Acid Moieties | | | Melt | Intrinsic |
| --- | --- | --- | --- | --- |
| NaSIPA* | IPA* | PTA* | Point° C. | Viscosity |
| 0.5 | 1.79 | 97.71 | 247 | 0.82 |
| 0.5 | 1.79 | 97.71 | 254 | 0.83 |
| 2.0 | 2.45 | 95.55 | 243 | 0.82 |

Note:
19 gms of sodium acetate were added to the melt reactions yielding the higher melt point. The sodium acetate suppresses the formation of di-ethylene glycol as reflected in the increased melt point.
*Although the abbreviation is to the Acid, it refers to the acid moiety, for instance, NaSIPA refers to the sodium sulfoisophthalic acid moiety which occurs as sodium sulfoisophthlate in the polymer chain.

Example 2

Manufacture of Modified Polymer Via Extrusion 25 mole percent sodium sulfoisophthalate and 75 mole percent terephthalate modified polymer was made using the melt production techniques of Example 1. The polymer was then dried and melt blended with a twin screw extruder into Cleartuf® 8006S Polyester Resin from M&G Polymers, LLC, USA to achieve a polymer with 2 mole percent SIPA. Cleartuf® 8006S Polyester Resin is a 98.5 mole percent terephthalic acid, 1.5 mole percent isophthalic copolymer of polyethylene terephthalate resin. The polymer was then solid phase polymerized under vacuum to 0.862 dl/gm IV.

Other series were made in the same manner. In one case the 25% sodium sulfoisophthalate compound with 8006S to achieve a 0.5 mole percent final sodium sulfoisophthalate content and then blended with 5% MXD6 Grade 6007 in a single screw Arburg Injection machine with low shear conditions.

The 25% SIPA compound was blended with Turbo® II from M&G Polymers USA, LLC, a 5% IPA, 95% TPA copolymer, to achieve a 0.5 mole percent final sulfoisophthalate content and further blended and 5% MXD6 Grade 6007 in a single screw Arburg Injection machine with low shear conditions.

The 25% sulfoisophthalate compound was melt blended with Cleartuf 8006S® polyester, 2500 ppm of Freshblend® iron particle oxygen scavenger (Multisorb Technologies, Incorporated, Buffalo, N.Y.) with 5% MXD6 Grade 6007 in a single screw Arburg Injection machine with low shear conditions to achieve a 2 mole percent final sulfoisophthalate content.

The results are presented in Table II. As can be seen, changing the PET type or the amount of sodium sulfoisophthalate had little affect on the domain size. Copolymerization yielded better results in all cases.

TABLE II

Diameter of Dispersed Particles in Nanometers

| | PET Control 8006 | | Reactive Extrusion (Example 2) | | Melt Polymerized Random Copolymer | |
|---|---|---|---|---|---|---|
| | Diam. (nm) | Std. Dev. | Diam. (nm) | Std. Dev. | Diameter (nm) | Std. Dev. |
| 0% SIPA, 5% MXD6 | 200 | 76.2 | | | | |
| 0.5 mole % NaSIPA, 5% MXD6 | | | 97 | 36.3 | 78 | 27.5 |
| 0.5 mole % NaSIPA 5% MXD6 | | | 97 | 34.1 | 74 | 22.7 |
| 2 Mole % NaSIPA 5% MXD6 | | | 100 | 29.1 | 81 | 26.2 |
| 0.18 Mole % LiSIPA 7% MXD6 | | | | | 76.93 | 37.28 |
| 0.37 Mole % LiSIPA 7% MXD6 | | | | | 67.85 | 34.44 |
| 0.74 Mole % LiSIPA 7% MXD6 | | | | | 69.73 | 31.37 |
| 1.11 Mole % LiSIPA 7% MXD6 | | | | | 77.98 | 39.89 |
| 2.0 Mole % LiSIPA 7% MXD6 | | | | | 90.6 | 37.46 |

The SIPA refers again to the acid moieties in this table.

Example 3

Lithium Sulfonate with Cobalt Salt

A copolyethylene terephthalate was made which contained various amounts lithium sulfonate in the form of lithium sulfoisophthalate derived from lithium sulfoisophthalic acid (LiSIPA). The lithium sulfoisophthalate modified copolymer was manufactured by placing 7567 gms of terephthalic acid, 157 gms of isophthalic acid, and 2974 gms of ethylene glycol into a vessel of pre-reacted oligomers from the previous batch. The contents were held under 35 psig pressure at 262° C. After 35 minutes, 45.4 gms of 1% lithium by weight mixture of lithium acetate in ethylene glycol and 18.1 gms of 1% phosphorous by weight mixture of phosphoric acid diluted in ethylene glycol was charged to the reactor. The contents were held in this vessel under agitation for 3 hours with an oil temperature of 271° C., content temperature increasing from 248° C. to 263° C., and 35 psig. During the time water was removed from the vessel.

After reacting for 3 hours, a portion of the contents were transferred to a second vessel. The amount remaining in the first vessel was approximately the same amount as was in the vessel when the raw materials were first charged. Once in the second vessel, 146 gms of a 5% bis-hydroxyethyl ester of lithium sulfoisophthalic acid—95% ethylene glycol solution and 1044 gms of ethylene glycol were added to the material transferred from the first vessel to the second vessel. The contents of the second vessel were agitated at atmospheric pressure and 244° C. After 30 minutes another 146 gms of the bis-hydroxy ester of lithium sulfoisophthalic acid, 1044 gms of ethylene glycol were added to the second vessel. After 30 minutes of mixing, 38.6 gms of 0.47% by weight cobalt mixture of cobalt acetate and ethylene glycol were added to the second vessel. After 3 minutes of mixing 206 gms of a 1% antimony by weight mixture of Antimony oxide in ethylene glycol was added to the vessel. After 45 minutes the pressure was reduced to 100 mm Hg, and after another 26 minutes, the pressure reduced to 1.0 mm Hg. 40 minutes later the pressure was 0.2 mm Hg and held for 20 minutes before discharging the ingredients and pelletizing the material.

This amorphous material was combined with several other similarly produced batches and then solid phase polymerized in a batch rotating vacuum vessel at 0.1 mmHg and 232° C. until a 0.802 I.V. (di/gm) was reached. The amount of lithium sulfoisophthalate was varied for the resulting mole percentages. The amount of lithium sulfoisophthalate reported in the tables is based upon measuring the amount of sulfur in the polymer and not upon the amount charged.

This material was combined with 7% by weight MXD6 nylon (Grade 6007 from Mitsubishi Gas Chemical, Japan) and injection molded into a preform. The preform was subjected to SEM analysis (FIG. 3) and compared to a similar preform with unmodified polyester (FIG. 1). As can be readily seen from the photomicrographs, the average polyamide particle size of the unmodified system is much larger than the particle size of the modified system. The larger particle size of the unmodified system indicates the higher interfacial surface tension. The analysis of the domains (FIGS. 2 and 4) show a much broader distribution for the unmodified system as well. The superiority of the lithium sulfoisophthalate is also demonstrated in Table III which compares the change in Haze per mil. The 2 mole percent lithium sulfoisophthalate showed almost no change in haze due to increasing nylon contents, while the 2 mole percent sodium sulfoisophthalate still shows a significant affect.

It is noteworthy that the sodium sulfoisophthalate is not preferred for the stretched application, despite what the prior art claims. The prior art states that sodium sulfoisophthalate is the preferred material for the three component system. What has been discovered is that the sodium sulfoisophthalate gave an unacceptable haze, regardless of whether the stretched sample contained nylon. Unlike sodium sulfoisophthalate in these examples, lithium sulfoisophthalate did not exhibit a relatively high inherent haze, thus making it the best commercially acceptable material.

The optimum concentration and superiority of the low level of lithium sulfoisophthalate is demonstrated in Tables III and IV. In all cases, 7% MXD6 Grade 6007 from Mistubishi Gas Chemical Co, Japan, was melt blended with PET—lithium sulfoisophthalate and made into parisons or preforms and subsequently blown into bottles. The mean particle diameter in nanometers was measured using the cold formic acid technique followed by SEM analysis as described in the test method section.

TABLE III

| | 0% LiSIPA | 0.18% LiSIPA With Cobalt | 0.37% LiSIPA With Cobalt | 0.5% LiSIPA without Cobalt | 0.74% LiSIPA With Cobalt | 1.11% LiSIPA With Cobalt | 2% LiSIPA With Cobalt |
|---|---|---|---|---|---|---|---|
| Lithium Sulfoisophthalate Characterization | | | | | | | |
| Mean Preform Particle Diameter (nm) | 200 | 76.93 | 67.85 | | 69.73 | 77.98 | 90.60 |
| Standard Deviation of Particle Distribution | 76.2 | 37.28 | 34.44 | | 31.37 | 39.89 | 37.46 |
| Average Increase in I.V. Loss During Injection molding from (no SIPA) control | | 0.005 | 0.013 | | 0.014 | 0.018 | 0.043 |
| Increase in Preform Acetaldehyde (ppm) from Control | | | 2.0 | | 3.2 | 6.7 | 5.7 |
| Increase (+) or decrease (−) in b* Color after 7 hrs drying in N2 bed at 150° C. vs. control with no SIPA of −0.13 | | | −1.06 | | −0.50 | | −0.32 |
| b* incr/decr when converting pellets to bottle vs. control with no SIPA of +4.5 | | −0.093 | −4.50 | | +0.16 | +1.69 | +3.18 |
| Change in Hunter Haze per mil (%) versus control with no SIPA of 0.46 | | | −0.34 | −0.39 | −0.44 | +0.49 | −0.46 |
| Change in b* when converting pellets to bottle divided by percent MXD6 6007 | | | 1.97 | 1.81 | 1.32 | 0.69 | 1.72 |

*The 1.11% LiSIPA was analyzed for the nylon content and 9.5% was found as opposed to 7%. This variability happens during the extrusion process. The others were analysed for nylon content as well with far less deviations from the 7% target.
**Again, the LiSIPA in this table refers to the acid moieties of lithium sulfoisophthalate.

Example 4

Comparative Examples

Tables IV and V demonstrate the ability of the polyester polymer modified with a small amount of the co-monomer to virtually eliminate the haze brought on by blending nylon into the polymer 3 and 5 weight percent of two polyamides (MXD6—Grades 6001 and 6007 from Mitsubishi Gas Chemical, Japan) were melt blended into preforms with Cleartuf® Polyester Resin 8006S and Turbo®® II (both available from M&G Polymers USA) and the three modified materials listed in Table I. While 8006S and Turbo® II were the controls, Turbo® II is modified with approximately 5 mole percent isophthalic acid. 0.5 L Bottles were blown from the preforms and haze measured on each bottle (as opposed to the sidewall). The haze is reported Table IV and the change in haze per mil of the stretched wall from the control with no polyamide are reported in Table V. The change is haze per mil from the control is calculated by subtracting the haze per mil of the wall without the nylon from the haze per mil of the wall with the nylon. The more effective the material in reducing the interfacial tension, the less the change in haze as more nylon is added. In each case, the modified polymers suppressed the haze caused by the addition of the nylon.

The particle dispersion analysis was also conducted on the various unstretched preforms. The results for the dispersion of 5% nylon (MXD6 Grade 6001) are shown when added to the unmodified materials, the reactive extrusion method and the melt polymerization method. The results in Table IV indicate that the reactive extrusion achieves some advantages, but that complete randomization has not occurred. The superiority of the random copolymer is demonstrated by the fact that in each and every case, the diameter of the particle is significantly smaller than the particle of the others.

TABLE IV

| % MXD6, Grade MXD6 | Turbo ® II | Cleartuf 8006S | 2 mole % NaSIPA (MP 243° C.) | 0.5 mole % NaSIPA (MP 247° C.) | 0.5 mole % NaSIPA (MP 254° C.) | 0.18 mole % LiSIPA w/ Cobalt | 0.37 mole % LiSIPA w/ Cobalt |
|---|---|---|---|---|---|---|---|
| Hunter Haze per mil of sidewall | | | | | | | |
| 0%, 6001 | | 0.08 | 0.15 | 0.34 | 0.12 | | |
| 3%, 6001 | | 0.36 | 0.19 | 0.29 | 0.26 | | |
| 5%, 6001 | | 0.46 | 0.22 | 0.33 | 0.31 | | |
| 0%, 6007 | 0.12 | 0.11 | 0.15 | | | 0.33 | 0.25 |
| 3%, 6007 | 0.23 | | 0.17 | | | 0.38 | 0.28 |
| 5% 6007 | 0.46 | 0.99 | 0.22 | | | | |
| 7% 6007 | | | | | | 0.45 | 0.32 |

TABLE IV-continued

Hunter Haze per mil of sidewall

| % MXD6, Grade MXD6 | 0.50 mole % LiSIPA No Cobalt | 0.74 mole % LiSPA w/ Cobalt | 1.11 mole % LiSIPA w/ Cobalt | 2.00 mole % LiSIPA w/ Cobalt |
|---|---|---|---|---|
| 0%, 6001 | | | | |
| 3%, 6001 | | | | |
| 5%, 6001 | | | | |
| 0%, 6007 | 0.18 | 0.50 | 0.80 | 0.40 |
| 3%, 6007 | 0.22 | 0.47 | 0.82 | 0.40 |
| 5% 6007 | 0.24 | | | |
| 7% 6007 | 0.27 | 0.51 | 0.77 | 0.40 |

*The nomenclature NaSIPA or LiSIPA in this table means the mole percent of the acid moietites of lithium sulfoisophthalate. However, one skilled in the art knows that mole percent of lithium sulfoisophthalate is equal to the mole percent of the starting monomer.

TABLE V

Change in Haze per mil from 0% Nylon Control Bottle

| | Turbo ® II | Cleartuf 8006S | 2 mole % NaSIPA (MP 243° C.) | 0.5 mole % NaSIPA (MP 247° C.) | 0.5 mole % NaSIPA (MP 254° C.) | 0.18 mole % LiSIPA | 0.37 mole % LiSIPA |
|---|---|---|---|---|---|---|---|
| 3% 6001 | | 0.27 | 0.04 | −0.06 | 0.15 | | |
| 5% 6001 | | 0.38 | 0.08 | −0.01 | 0.20 | | |
| 3% 6007 | 0.23 | | 0.03 | | | 0.05 | 0.03 |
| 5% 6007 | 0.46 | 0.88 | 0.07 | | | | |
| 7% 6007 | | | | | | 0.12 | 0.07 |

| | 0.50 mole % LiSIPA No Cobalt | 0.74 mole % LISPA | 1.11 mole % LiSIPA | 2.00 mole % LiSIPA |
|---|---|---|---|---|
| 3% 6001 | | | | |
| 5% 6001 | | | | |
| 3% 6007 | 0.04 | 0.01 | 0.02 | 0.00 |
| 5% 6007 | 0.06 | | | |
| 7% 6007 | 0.09 | 0.03 | −0.03 | 0.00 |

*The nomenclature NaSIPA or LiSIPA in this table means the mole percent of the acid moietites of lithium sulfoisophthalate. However, one skilled in the art knows that mole percent of lithium sulfoisophthalate is equal to the mole percent of the starting monomer.

Example 5

Lithium Sulfonate without Cobalt Salt

A copolymer of polyethylene terephthalate containing 0.5 mole percent lithium sulfonate (lithium sulfoisophthalate) was made in the same manner as Example 3, except that the cobalt acetate was replaced with a non-cobalt colour package. The colour package was added at the beginning of the reaction and consisted of 3.03 ppm on the basis of the final polymer yield SB 138 (Solvent Blue 138) and 1.60 ppm on the basis of the final polymer yield SV50 (Solvent Violet 50). Both colorants are available from Colorchem International as Amaplast Violet PC and Amaplast Blue HB. These colorant levels were selected to yield the similar L*, a*, b* as the cobalt acetate.

As demonstrated in Table VI, the 0.5 mole percent lithium sulfonate material had much better colour with 5% MXD6 than did the equivalent 0.5 mole percent sodium sulfonate with cobalt acetate. In fact, it had better colour than the sodium sulfonate at 2 mole % when combined with MXD6 in the presence of a cobalt salt. This proves the superiority of the lithium sulfonate over sodium sulfonate as a cobalt salt is not needed to control colour when the material is melt mixed with MXD6 Nylon.

TABLE VI

Cobalt versus No Cobalt

| Nylon Grade | Polymer Type | Weight Percent Nylon | Bottle b* |
|---|---|---|---|
| 6001 | 0% SIPA, Cleartuf ® 8006S | 0 | |
| | | 5 | |
| | 0.5% NaSIPA, Cobalt | 0 | |
| | | 3 | 13.78 |
| | | 7 | 14.91 |
| 6007 | 0% SIPA, Cleartuf ® 8006S | 0 | 1.51 |
| | | 5 | 15.5 |
| | Turbo II, High IPA, High Clarity, Bottle Grade PET, No SIPA | 0 | 1.12 |
| | | 3 | 10.6 |
| | | 6 | 15.38 |
| | 0.5% LiSIPA, No Cobalt | 0 | 4.81 |

TABLE VI-continued

Cobalt versus No Cobalt

| Nylon Grade | Polymer Type | Weight Percent Nylon | Bottle b* |
|---|---|---|---|
| | | 3 | 8.78 |
| | | 5 | 11.01 |
| | 2.0% NaSIPA, Cobalt | 7 | 12.49 |
| | | 0 | |
| | | 3 | 13.34 |
| | | 7 | 15.18 |

*The nomenclature NaSIPA or LiSIPA in this table means the mole percent of the acid moietites of lithium sulfoisophthalate. However, one skilled in the art knows that mole percent of lithium sulfoisophthalate is equal to the mole percent of the starting monomer.

The bottle Hunter b* is measured on a 0.5 Liter bottle with nominal wall thicknesses of 0.36 mm to 0.42 mm, where the bottle itself is placed into a properly adapted machine and the light passes through both bottle sidewalls. Thus a bottle having a Hunter b* colour as measured on the bottle through both sidewalls of less than 20 units without Cobalt is easily achievable through the teachings of this specifications. Also taught is a bottle with a Hunter b* colour of less than 15 units. Also present in the bottle may be a colorant or colorant system such as a pigment or dye which reduces the Hunter b*. It is also noted that these bottles had less than 0.5% haze per mil Example 6

Lithium Sulfonate with Aliphatic Polyamide (nylon 6)

Figure 5:
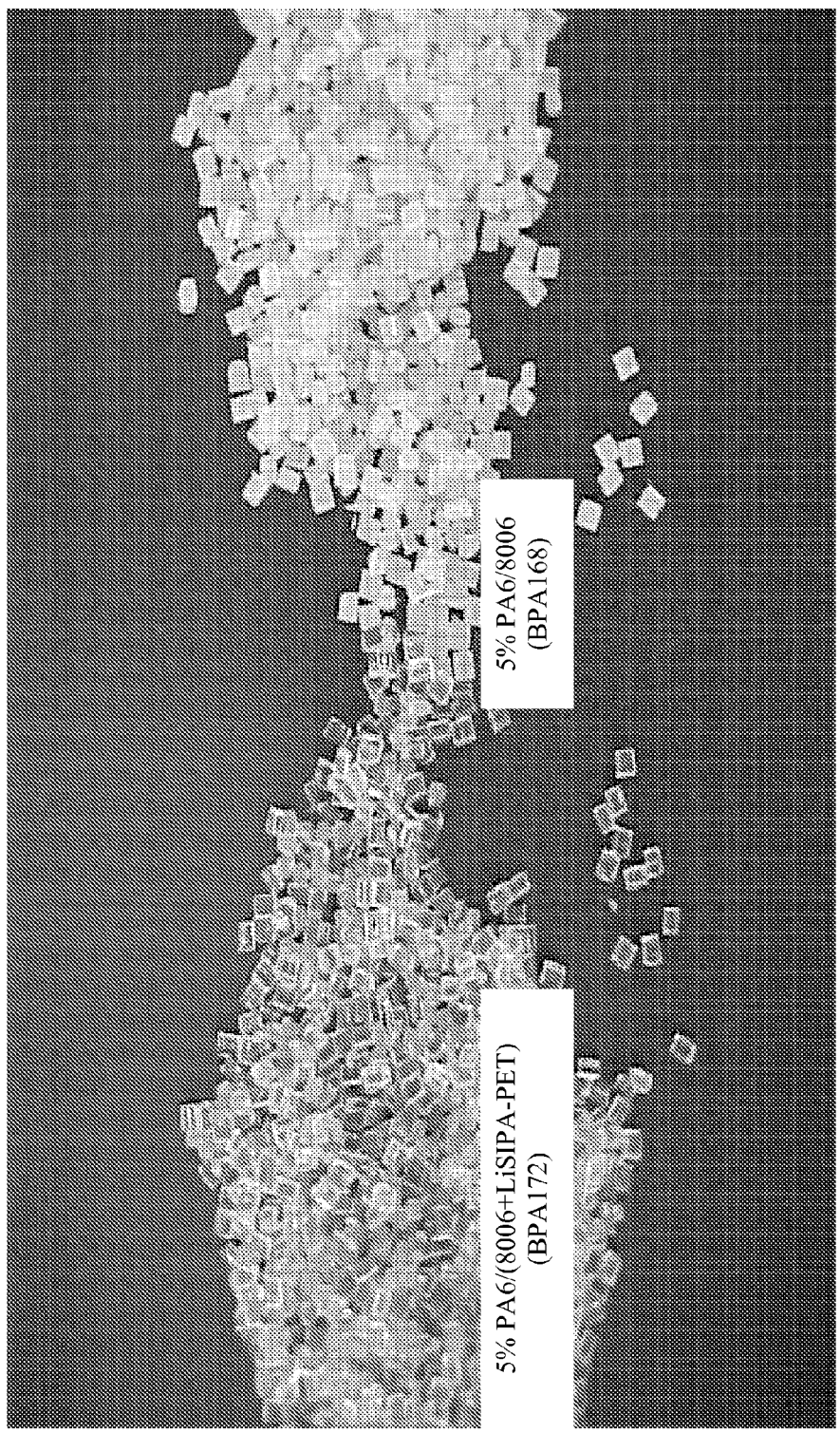
FIG. 5 depicts a photograph of the pellets of a crystallizable polyethylene terephthalate blended with polyamide 6, also known as PA6 or nylon 6 with and without the interfacial tension reducing agent derived from lithium sulfoisophthalic acid (LiSIPA). The impact of the interfacial tension reducing agent is readily seen in the immediate clarity of the composition containing the lithium sulfoisophthalate.

Three blends were made demonstrating the effect of LiSIPA on nylon 6 and MXD6 blended with nylon 6. The first blend was 5% by weight PA6 with 95% by weight Cleartuf® 8006 polyethylene terephthalate from M&G Polymers, USA. The blend was made into preforms and blown into a bottle. As shown in FIG. 5, the unmodified PET when blended with PA6 is very milky white and when blown into a bottle has approximately 3% haze per mil thickness. The resulting blend is clear as shown in FIG. 5 when the PA6 is blended with 0.5 mole percent lithium sulfoisophthalate modified polyethylene terephthalate and the bottle haze is 0.5% per mil. For comparison, the bottle haze of the lithium sulfoisophthalate modified polyethylene terephthalate and unmodified polyethylene terephthalate are each approximately 0.2 percent haze per mil without any nylon. A blend of 1.5% by weight PA6, 3.5% MXD6 and 95% polyethylene terephthalate was also made with similar results. The haze for the unmodified polyethylene terephthalate was approximately 1.15 percent per mil, while the haze for the polyethylene terephthalate modified with lithium sulfoisophthalate was 0.3 percent per mil.

Example 7

Lithium Sulfoisophthalate in the Core-Shell Structure

In this series of experiments, various core-shell configurations were evaluated as shown in Table V. The PET was Cleartuf 8006 and the MXD6 was grade 6007. The modified polyester contained 2.5 mole percent lithium sulfoisophthalate of sodium sulfoisophthalate. The superiority of the lithium is again demonstrated by comparing B with D and C with E. In both comparisons, the lithium sulfoisophthalate had much lower haze. The average domain size of the unmodified system was 200±61 nanometers, while the average domain size for the polymer modified with lithium sulfoisophthalate (D) was 57±27 nanometers, a reduction of almost 72%. Also noted is the superiority of placing the PET and the modified polyester in the same compartment as opposed to placing the nylon and modified polyester in the same compartment.

TABLE VII

Core-Sheath Comparisons of Sodium and Lithium Sulfoisophthalate

| | Core | Shell | L* | a* | b* | Haze (%) |
|---|---|---|---|---|---|---|
| A | Control, no core | 5% MXD6, 95% PET | 78.46 | −0.15 | 14.34 | 12.99 |
| B | 5% MXD6 | 19% of 2.5 mole % NaSIPA, 76% PET | 79.98 | −0.19 | 12.20 | 10.37 |
| C | 5% MXD6, 5% 2.5 mole % NaSIPA | 90% PET | 76.05 | 0.01 | 12.93 | 23.36 |
| D | 5% MXD6 | 19% of 2.5 mole % LiSIPA, 76% PET | 85.25 | −0.55 | 7.38 | 4.37 |
| E | 5% MXD6, 5% 2.5 mole % LiSIPA | 90% PET | 76.85 | −0.05 | 14.83 | 12.39 |
| F | 5% MXD6 | 5% of 10 mole % NaSIPA, 90% PET | 68.71 | 0.89 | 16.42 | 23.64 |
| G | 5% MXD6, 5% 10 mole % NaSIPA | 90% PET | 70.46 | 0.52 | 15.41 | 37.79 |

The NaSIPA and LiSIPA, refer to the acid moities as incorporated into the polyester backbone.

Example Series 9

Demonstration of Lithium's Unique Stretch Characteristics

The following examples demonstrate the functionality of this invention. In examples 1 through 3, 100 grams of polyamide pellets with the end group and molecular weights provided in Table I were dried separately and melt blended with 1900 grams of polyester having the characteristics demonstrated in Table VI. Note that the polyester in Examples 9B and 9C contained the interfacial tension reducing agent with sodium and lithium respectively at the mole percents indicated polymerized into the backbone of the polymer. Example 9B is Crystar 3919/089 available from E.I. Dupont Nemours. The polyester with interfacial reducing agent, lithium sulfoisophthalate, copolymerized into the backbone used in Example 9C were prepared as disclosed earlier.

TABLE VIII

| | Example | | |
|---|---|---|---|
| | 9A PET MXD6 6007 | 9B Na SIPA MXD6 6007 | 9C Li SIPA MX D66007 |
| Polyamide (wt % of polymer components) | 5 | 5 | 5 |
| R.V. | 2.7 | 2.7 eg meas | 2.7 |
| AEG (mmol/kg) | 16 | 16 | 16 |
| CEG (mmol/kg) | 68 | 68 | 68 |
| AEG/CEG (Amino/Acid End Group Ratio) | | | |
| Mn based on TEG Polyester and Interfacial Tension | 23810 95 | 23810 95 | 23810 95 |

TABLE VIII-continued

| | Example | | |
|---|---|---|---|
| | 9A PET MXD6 6007 | 9B Na SIPA MXD6 6007 | 9C Li SIPA MX D66007 |
| Reducing Agent (wt % of polymer components) | | | |
| PTA mole % | 97.5 | 98.2 | 98.3 |
| IPA mole % | 2.5 | | 1.2 |
| LiSIPA mole % | | | 0.5 |
| NaSIPA mole % | | 1.72 | |
| Cobalt (ppm) | | 40 | 25 |
| Preform | | | |
| Domain Size (nm) | | 71.9 | 47.6 |
| Stretch Ratio of Axis Measured | 2.91 | 3.36 | 2.73 |
| Hunter b* | 11.83 | 10.59 | 8.3 |
| Thickness (mm) | 0.3 | 0.28 | 0.29 |
| Domain Size (nm) | | 220 | 93.2 |
| Domain Stretch Ratio in hoop direction | | 3.06 | 1.96 |
| Stretch Ratio of Axis Measured | 2.91 | 3.36 | 2.73 |
| Percent of Stretch | | 92 | 71 |
| Haze (%) | 12.09 | 5.7 | 6.1 |
| Haze/mm | 40 | 20 | 21 |

Test Methods
Intrinsic Viscosity

The intrinsic viscosity of intermediate molecular weight and low crystalline poly(ethylene terephthalate) and related polymers which are soluble in 60/40 phenol/tetrachloroethane can be determined by dissolving 0.1 gms of polymer or ground pellet into 25 ml of 60/40 phenol/tetrachloroethane solution and determining the viscosity of the solution at 30° C.±0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 gms of polymer or ground pellet into 25 ml of 50/50 trifluoroacetic Acid/Dichloromethane and determining the viscosity of the solution at 30° C.±0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is IV in 60/40 phenol/tetrachloroethane=0.8229×IV in 50/50 trifluoroacetic Acid/Dichloromethane+0.0124

The Hunter Haze Measurement

The measurements were taken through the bottle side-walls. A HunterLab ColorQUEST Sphere Spectrophotometer System, assorted specimen holders, and green, gray and white calibration tiles, and light trap was used. The HunterLab Spectrocolorimeter integrating sphere sensor is a colour and appearance measurement instrument. Light from the lamp is diffused by the integrating sphere and passed either through (transmitted) or reflected (reflectance) off an object to a lens. The lens collects the light and directs it to a diffraction grating that disperses it into its component wave lengths. The dispersed light is reflected onto a silicon diode array. Signals from the diodes pass through an amplifier to a converter and are manipulated to produce the data. Haze data is provided by the software. It is the calculated ratio of the diffuse light transmittance to the total light transmittance multiplied by 100 to yield a "Haze %" (0% being a transparent material, and 100% being an opaque material). Samples prepared for either transmittance or reflectance must be clean and free of any surface scratches or abrasion. The size of the sample must be consistent with the geometry of the sphere opening and in the case of transmittance; the sample size is limited by the compartment dimension. Each sample is tested in four different places, for example on the bottle sidewall or representative film area.

A Panametrics Magna-Mike 8000 Hall Effect Thickness Gauge was employed to measure the bottle sidewall thickness.

Dispersed Domain Analysis.
Scanning Electron Microscopy

The sample is prepared by cutting the preform or wall of the container and putting the cut pieces in liquid nitrogen for five minutes. The pieces are then broken with a sharp blow. One piece of the perform or wall is cut into a slice at the specified angle. The slice is placed into a 50 cc. beaker and covered with approximately 25 cc of ≧96% formic acid (available as ACS reagent [64-18-6] from Fluka, Aldrich or Merck) and stirred at room temperature. The sample is removed after one hour take the slice and washed with water until the water is a neutral pH. The sample is then washed with acetone.

After washing in acetone, the specimen is placed into an agar auto sputter coater (model 108 A, s.n. A10S) and plated with gold in order to make it conductive. Typical conditions for the agar auto sputter coater are to use an Argon flow, at 20 mA current for 30 seconds using gold metal.

The coated specimen is then placed into the SEM holder and photo taken. A typical SEM machine is SEM Leo Electronic Microscopy Ltd, model LEO 1450 VP,s.n. 01-22 used in vacuum chamber modality with Secondary Electron Detection 1 acquiring system. Other settings are Tension EHT: 20 KV
Focal distance, also known as working distance or WD: 10-11 mm
Spot size (dimensionless): 200-300 decreasing to 80 at large magnifications
Filament current: 3-3.5 A depending upon filament age.

The dimensions and distribution of polyamide domains are measured using Lucia M software (available from Laboratory Imaging and may come as a package with a SEM machine provided by Nikon Japan) in automatic or manual mode. Typically, more than 250 domains are measured over 10 different pictures, with the number of domains analyzed per picture increasing with better dispersions. A statistical analysis on the domains is then carried out to determine the mean, the median and the distribution of the domains as in FIG. 4, and frequency of domains at a given size interval per unit area for each sample.

What is claimed is:

1. A bottle comprising a layer with a stretched region, wherein the layer is comprised of a polyamide comprising at least one reaction product selected from the group consisting of the reaction of amino caproic acid with itself, and the reaction product of A-D where A is a residue of dicarboxylic acid comprising adipic acid, isophthalic acid, terephthalic acid, 1,4 cyclohexanedicarboxylic acid, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof, dispersed into a crystallizable polyester with at least 85% of the polyester acid units derived from terephthalic acid or the dimethyl ester of terephthalic acid, an interfacial tension reducing agent
   wherein the interfacial tension reducing agent is lithium sulfobenzoate and wherein the stretch ratio of the polyamide domains divided by the stretch ratio of the crystallizable polyester in the same direction is less than 75% and the wall is void of a cobalt compound.

2. The bottle of claim 1 wherein the polyamide is nylon 6.

3. The bottle of claim 1 wherein the polyamide is selected from the group consisting of MXD6 and nylon 6.

4. The bottle of claim 1 wherein the polyamide is MXD6 nylon.

5. The bottle of claim 1 wherein the average diameter of the dispersed particles is less than 100 nm.

6. The bottle of claim 1 wherein the average diameter of the dispersed particles is less than 75 nm.

7. The bottle of claim 1 wherein the average diameter of the dispersed particles is less than 60 nm.

8. The bottle of claim 1 wherein the average diameter of the dispersed particles is less than 50 nm.

* * * * *